United States Patent [19]

Schpak et al.

[11] 4,232,966
[45] Nov. 11, 1980

[54] CONTACT LENS DEVICE

[75] Inventors: Fred Schpak, Evanston; Ian D. Malkes, Morton Grove, both of Ill.

[73] Assignee: Laco Laboratories, Inc., Skokie, Ill.

[21] Appl. No.: 47,897

[22] Filed: Jun. 12, 1979

[51] Int. Cl.³ .............................................. G01N 21/01
[52] U.S. Cl. .................................... 356/244; 356/124; 294/1 CA
[58] Field of Search .............................. 356/124–127, 356/244; 294/1 CA

[56] References Cited

U.S. PATENT DOCUMENTS

| 3,027,804 | 4/1962 | Wesley et al. | 356/244 |
| 3,132,887 | 5/1964 | Martinez | 294/1 CA |

FOREIGN PATENT DOCUMENTS 1427118 2/1976 United Kingdom ..................... 356/125

Primary Examiner—John K. Corbin
Assistant Examiner—Bruce Y. Arnold
Attorney, Agent, or Firm—Wallenstein, Spangenberg, Hattis & Strampel

[57] ABSTRACT

A device for supporting a contact lens in any desired position with relation to an optical instrument to enable the parameters of the lens, especially the curvature and/or the axes of the surfaces of the lens, to be analyzed. The device comprises a base member which is provided with means for attaching it to an optical instrument such as a keratometer or radiuscope. The base member has an extension which carries a receptacle or container for a solid, resilient, elastomeric, lens-engaging material to which the concave and convex surfaces of a contact lens are removably adherable by slight pressure. The material is dry to the touch, non-blocking (i.e., no adhesion between the lens and the lens engaging material) and non-smearing with respect to the surface of a contact lens, and has a refractive index such that it eliminates reflection from the surface of the lens in contact with the material. A lens, when adhered to the material, can be oriented in any desired plane with respect to an optical instrument. A cover desirably is provided for the receptacle or container to shield the lens-engaging elastomeric material from contaminants, and an alignment card is provided to facilitate initial adjustment of an optical instrument with relation to the vertical axis of a lens. The base member also has lens marking means and angle indicating means which enable the axes of the surfaces of toric lenses to be analyzed quickly and accurately with an optical instrument.

16 Claims, 24 Drawing Figures

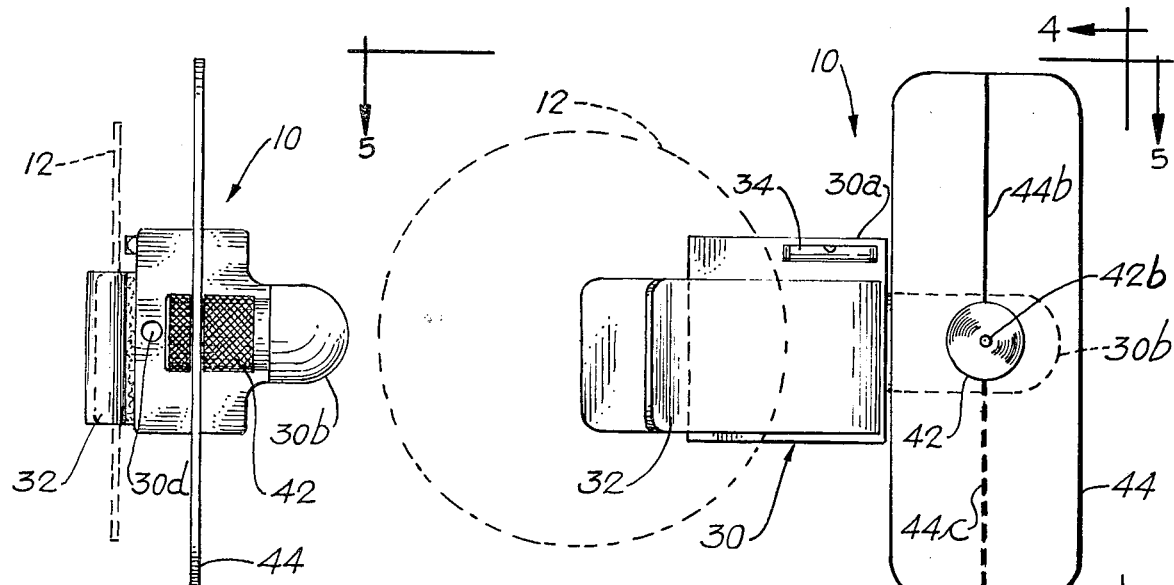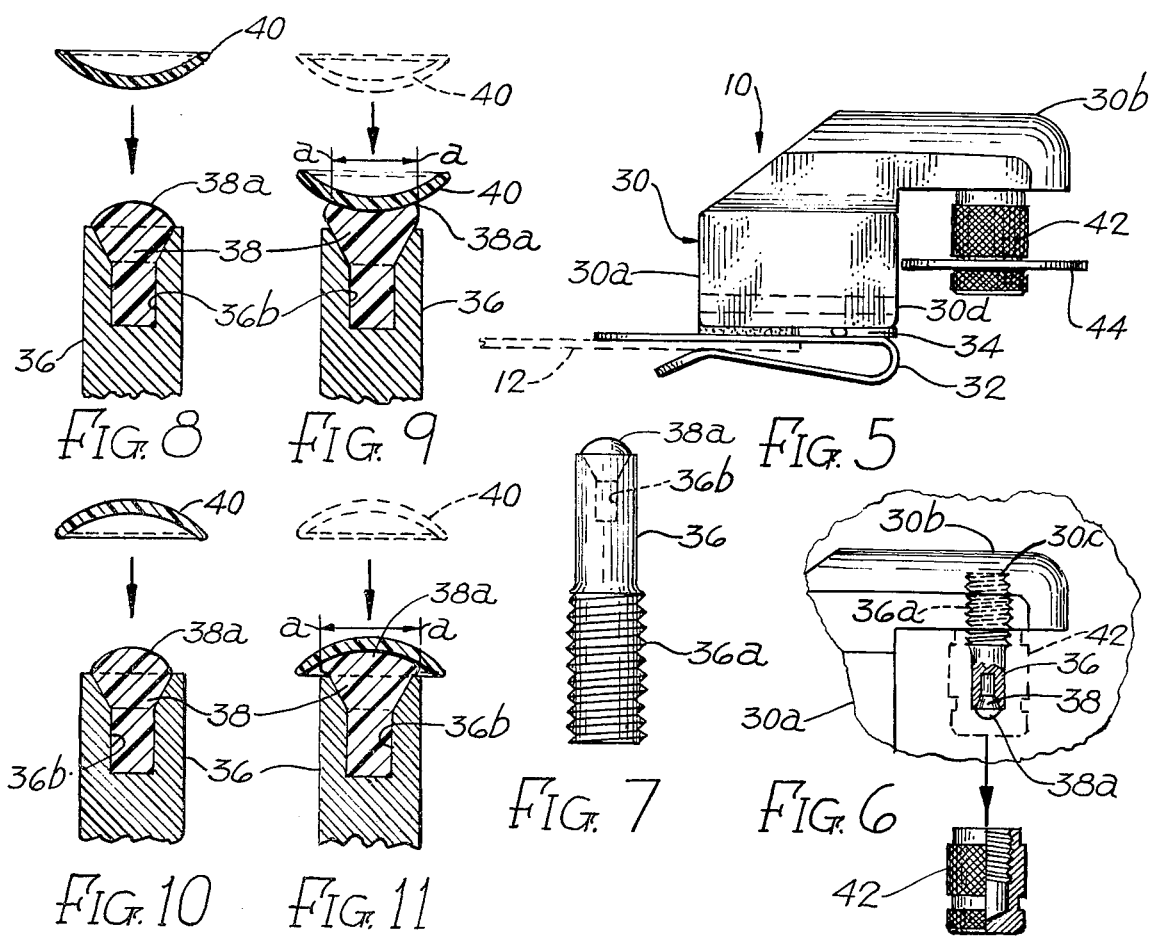

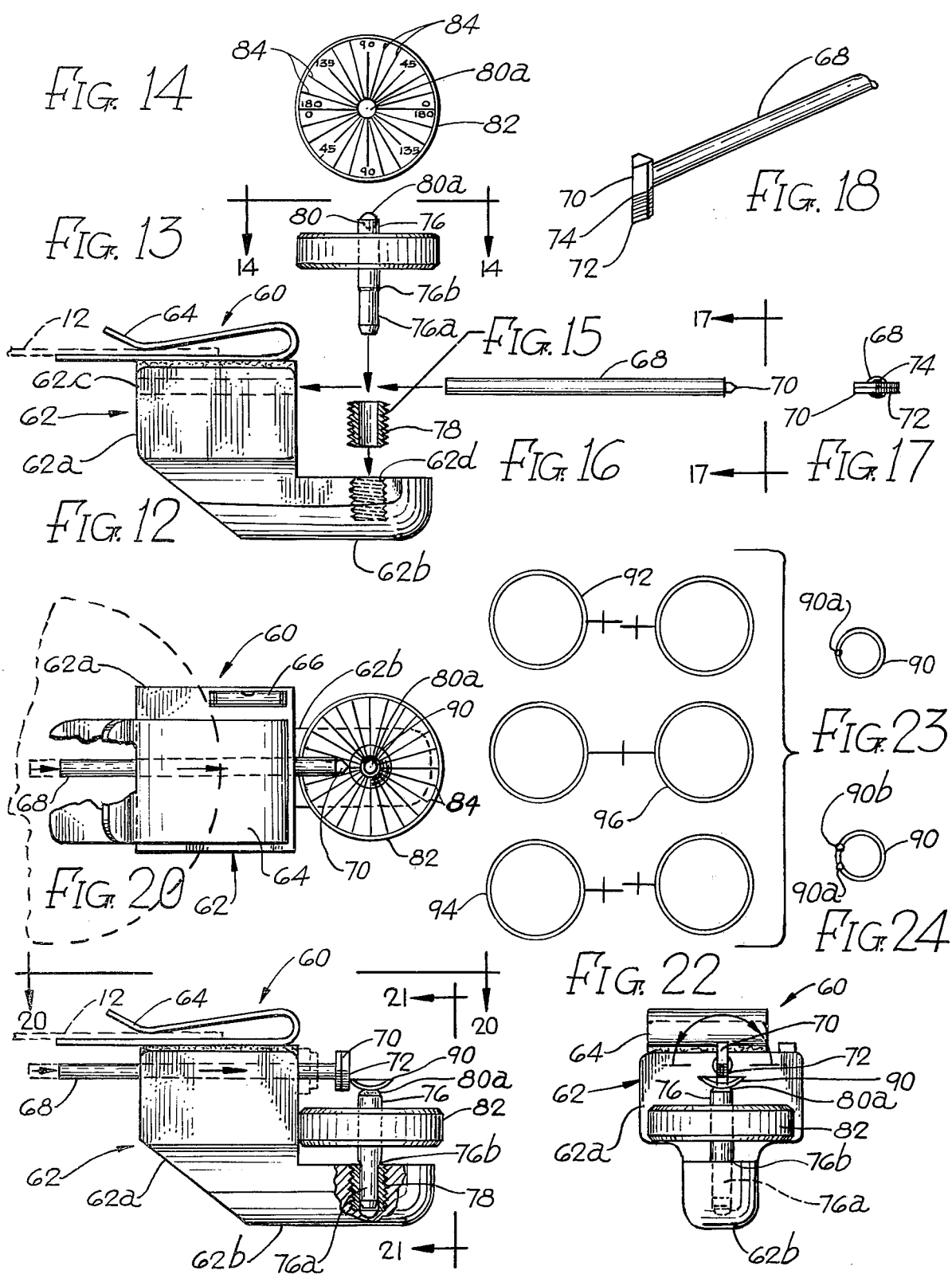

CONTACT LENS DEVICE

The present invention relates to a device for supporting a plastic contact lens on an optical analytical instrument to enable the parameters of the lens to be quickly and accurately analyzed.

Various means heretofore have been employed to support a contact lens in position to enable the parameters of the lens, particularly the curvature of the surfaces of the lens, to be measured with an optical instrument such as a keratometer or ophthalometer, or a radiuscope. Generally, speaking, such means comprises a concave seat for the lens. In order to maintain the lens on the seat so that its horizonal axis is in alignment with the lens system of the optical instrument being used, materials, including clay, toothpaste, grease, creams, and the like, are used. The stiff, viscous character of clay can cause a plastic contact lens to become distorted when it is pressed into the clay resulting in inaccurate readings. Clay also smudges the surface of the lens, requiring the lens to be thoroughly cleaned before it can be subjected to further analyses, or returned to the wearer. Toothpaste, grease and creams all create messy handling problems both in their application to a supporting concave seat and after measurement of the curvature of the lens has been completed.

Efforts to overcome the problems encountered in supporting a contact lens on a concave seat to permit accurate measurement of the curvature of the surfaces of the lens are typified by the contact lens support construction shown in U.S. Pat. No. 3,027,804. As in the case of prior contact lens supports, the support disclosed in the patent employs a concave seat. However, instead of using a material such as clay, toothpaste, grease, or a cream to enable the lens to be mainained on the seat with its horizontal axis aligned with the axis of the lens system of an optical measuring instrument, the lens support construction disclosed in the patent utilizes water to hold the lens on the seat with its axis vertically oriented. An adjustable mirror is positioned over the seat and reflects an image of the lens through the optical lens system of a measuring instrument to enable the concave surface of the lens to be analyzed. The entire unit, that is, the concave seat, the mirror, and the supporting structure for the seat and mirror are adapted to be fastened on the head rest frame of a keratomer, or the like. Although the support construction shown in the patent substitutes water for the less satisfactory materials named above, the highly fluid character of water places serious limitations on the handling of the support and its positioning in relation to an optical instrument. What is more, water, due to its comparatively low density, is highly susceptible to vibrational forces which, if experienced during measurement of a contact lens, can result in inaccurate readings. Wholly apart from the foregoing shortcomings of prior contact lens supports, whether they use water, or another material, namely, clay, toothpaste, grease or a cream, to maintain a contact lens on a seat, such supports do not lend themselves for use in analyzing both the concave and the convex surfaces of contact lenses, and this is especially so in the case of toric lenses which contain both spherical and cylindrical correction either on one, or both, surfaces of a lens. It is essential that the axes at the periphery as well as at the central portions of such lenses be accurate. So far as can be ascertained, no prior lens support satisfactorily enables the axes of the toric surfaces of such contact lenses to be properly analyzed.

In accordance with the present invention, a device for supporting a contact lens has been evolved which enables a contact lens to be maintained in a stable, fixed position with relation to an optical measuring instrument such as a keratometer or radiuscope without in any way distorting the lens, while at the same time enabling the lens to be readily re-positioned on the device, or removed from it, without smearing, smudging or otherwise adversely affecting the surfaces of the lens. The device supports a contact lens directly in front of the optical lens system of a measuring instrument thereby permitting an operator to view and analyze a lens in the same manner as would be the case if he were viewing and analyzing the cornea of the eye of a patient. In other words, the operator is not looking at a mirror reflected image of the contact lens, but is viewing the lens itself. The device, furthermore, can be used with equal facility to measure and/or verify the curvature and/or axes of the surfaces of standard contact lenses as well as toric contact lenses, including bitoric lenses. It can be easily and quickly mounted on conventional optical measuring instruments, and includes means for enabling a user to readily and properly align the device with respect to the axis of the lens system of the instrument. In one form of the invention, angle indicating and lens marking means are provided for the device which, in conjunction with a keratometer, or radiuscope, for example, permit errors in the axes of the surfaces of toric contact lenses to be detected with a high degree of accuracy.

In brief, the device comprises a base member provided with fastening means such as a clip for enabling the device to be releasably secured on an optical instrument. The base member has an extension which carries lens support means. The lens support means desirably comprises a cylindrically shaped container or receptacle for holding a solid, resilient lens-engaging material. The lens-engaging material provides a generally dome-shaped surface to which a contact lens can be removably adhered by slight pressure. The slight pressure exerted in adhering the lens to the dome-shaped surface causes the dome-shaped surface to flatten out and to conform to the curvature of that portion of the surface of the contact lens in engagement therewith. This condition of the lens-engaging material persists until the lens is removed, after which the lens-engaging material returns to its original dome shape. The lens-engaging material does not smear, smudge or leave any residue of any kind on the surface of the lens. Therefore, the lens is as clear and clean after removal from the material as it was before it was adhered thereto. A cover advantageously is provided for the container or receptacle which holds the lens-engaging material to prevent surface contamination of the material. The cover is adapted to support sighting means to aid a user of the device in aligning and focusing the lens system of an optical instrument with relation to the contact lens support means. A level desirably is provided on the base member to indicate the horizontal attitude of the base member in relation to the lens system of an optical instrument. In accordance with another embodiment of the invention, a disc having angle indicating indicia on a surface thereof is concentrically secured on rotatable lens support means, and the base member is provided with lens marking means for enabling, as indicated above, a user to analyze the axes of the surfaces of toric contact lenses.

The foregoing, and other advantages and features of the device will become apparent from the following description taken in conjunction with the accompanying drawings in which:

FIG. 3 is a front view in elevation of said embodiment;

FIG. 4 is a side view in elevation as viewed substantially along line 4—4 of FIG. 3;

FIG. 5 is a plan view as viewed substantially along line 5—5 of FIG. 3;

FIG. 6 is a fragmentary exploded plan view showing the contact lens support means of said embodiment of the device and the cover for said means;

FIG. 7 is a side view in elevation of the contact lens support means of said embodiment of the device;

FIG. 8 is a fragmentary sectional view of the lens support means and a contact lens before the lens is positioned on said means;

FIG. 9 corresponds to the view of FIG. 8, and shows the lens in position on said means with the convex surface of the lens adhered to the lens-engaging material comprising the lens support means;

FIGS. 10 and 11 are views corresponding to the views of FIGS. 8 and 9 with the lens reversed;

FIG. 12 is a side view in elevation of the base member of the device;

FIG. 13 is a side view in elevation of a modification of the lens support means with a circular disc, having degree indicating indicia thereon, secured thereto;

FIG. 14 is a front view in elevation of said disc as viewed substantially along line 14—14 of FIG. 13 showing the graduated degree markings thereon;

FIG. 15 is a side view in elevation of a bushing adapted to receive an end of the modified lens support means;

FIG. 16 is a side view in elevation of a lens marking element adapted to be rotatably supported in the base member;

FIG. 17 is an end view of the lens marking element as viewed substantially along line 17—17 of FIG. 16;

FIG. 18 is an enlarged perspective view of the lens marking element;

FIG. 19 is a side view in elevation of the modified embodiment of the device shown in FIGS. 12-16, with a contact lens mounted in position for analysis;

FIG. 20 is a front view in elevation of said modified embodiment as viewed substantially along line 20—20 of FIG. 19;

FIG. 21 is an end view in elevation of said modified embodiment as viewed substantially along line 21—21 of FIG. 19;

FIG. 22 is a representation of the mire images as seen through the lens system of a keratometer;

FIG. 23 is a view of a contact lens showing a mark made on the edge thereof by the marking element shown in FIG. 18; and FIG. 24 is a view of the reverse side of the contact lens shown in FIG. 23 showing a second mark on the edge of the lens made by said element.

Figure 1:
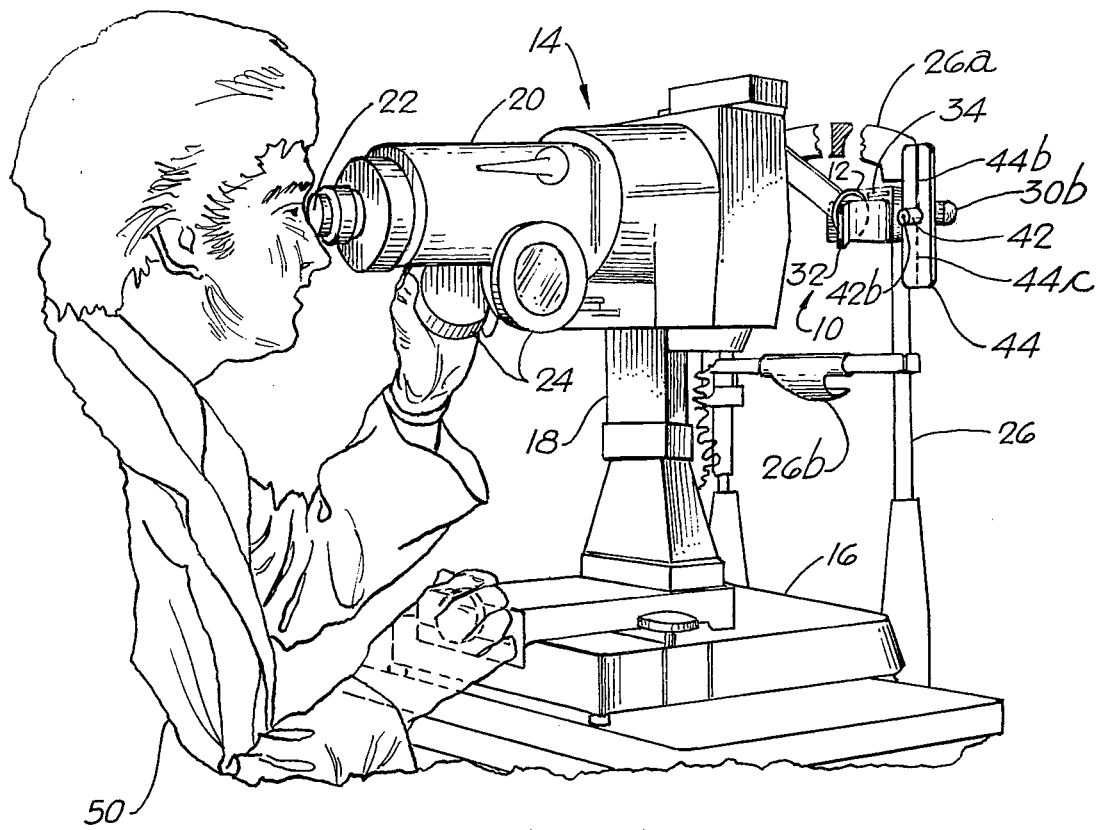
FIG. 1 is a view in perspective showing an embodiment of the device of the present invention mounted on the occluder of an optical instrument.
Figure 2:
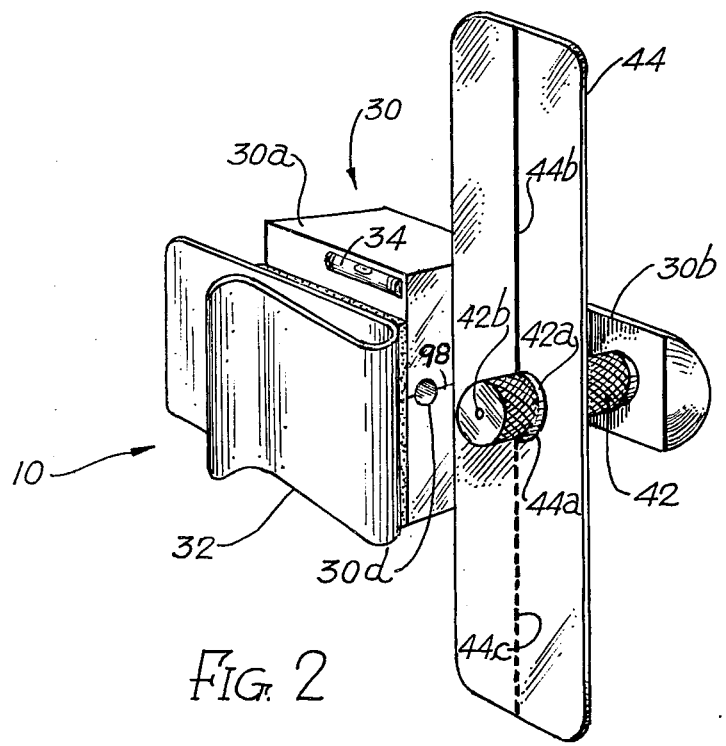
FIG. 2 is an enlarged view in perspective of said embodiment.

Referring, now, in greater detail to the drawings, an embodiment of the device, designated generally by reference numeral 10, is shown in FIG. 1 attached to the occluder 12 of a keratometer or similar instrument 14. The keratometer 14 comprises a base 16 connected by a vertically adjustable standard 18 to an optical head 20. The head 20 has an eye piece 22, and is provided with right and left fine adjustment and focusing knobs 24. The keratometer 14 is provided with means for measuring the curvature of contact lenses in either diopters, millimeters of radius, or both. As illustrated, a head rest frame 26 having a forehead engaging crosspiece 26a and a chin rest 26b is provided for the keratometer 14. The occluder 12, which is pivotally mounted, normally is positioned over one eye of a person undergoing an examination while the other eye is being viewed through the lens system of the keratometer. Thus, while the device 10 may be attached to other parts of an optical instrument, or otherwise supported in operative relation with respect to the lens system thereof, the occluder provides an excellent support means for the device 10 of the present invention in that it enables a contact lens supported on the device 10 to be positioned with relation to the lens system of the keratometer in substantially the same position as the eye of a person being examined with the instrument.

The device 10, as shown in FIGS. 2-5, comprises a base member 30 having a main body portion 30a and a lens supporting extension 30b. The base member 30 may be fabricated of a lightweight metal such as aluminum, or a plastics material such as polyethylene, teflon, or the like. Fastening means such as a clip 32 is secured to the front or forward surface of the main body portion 30a of the member 30 for attaching the device 10 to the occluder 12 of the keratometer 14. It should be understood, of course, that other means, for example, a clamp or a pressure sensitive adhesive material, may be used instead of the clip 32 for this purpose. The front or forward surface of the main body portion 30a of the member 30 also desirably has a level 34 secured thereto to enable a user of the device 10 to readily determine that the device is positioned in a horizontal plane on the occluder 12.

The lens supporting extension 30b of the base member 30 is provided with an internally threaded bore 30c (see FIG. 6) for receiving the externally threaded base or shank 36a of a substantially cylindrically shaped container or receptacle 36 (see FIG. 7). The receptacle 36 has a countersunk bore 36b for receiving a solid, resilient material 38 to which a surface of a contact lens 40 is removably adherable by slight pressure. The material 38 is characterized in that it is dry to the touch, is capable of retaining its rubberlike, resilient consistency over a wide temperature range, and is non-blocking and non-smearing, or non-smudging, with respect to the surface of a contact lens in engagement therewith. The material 38 is further characterized in that it has a refractive index such that it substantially eliminates reflection from the surface of a contact lens engaged thereon. As best shown in FIGS. 8-11, the material 38, when in the receptacle 36, provides a dome-shaped lens-engaging surface 38a. The surface 38a is deformed, as illustrated in FIGS. 9 and 11 when the contact lens 40 is adhered to it, but will instantly return to its original dome-shape when the lens 40 is removed. The adhesive force established between the material 38 and the surface of the lens 40 is sufficient to prevent involuntary movement on, or dislodgment of the lens 40 from the material 38 irrespective of the angle at which the lens 40 is oriented with respect to an optical measuring instrument. In other words, gravitational forces will not overcome the adhesive force which exists between the material 38 and the lens 40 after the lens 40 is adhered to the material 38 with slight pressure. In achieving the objective of a firm, but breakable, bond between the lens 40 and the material 38 without in any way distorting or otherwise adversely affecting the surface of the lens, the lens 40 advantageously is depressed into the material until the length, or diameter, as represented by line a—a in FIGS. 9 and 11, of the material 38 at the dome-shaped surface 38a in engagement with the contact lens 40 is of the order of about 4, or more, millimeters.

While the foregoing desiderata are satisfied by various polymeric materials, silicone elastomers, especially silicone rubbers and gels, are preferred materials for the purposes of the present invention. Exemplary of such rubbers or gels are organopolysiloxanes such as polydimethylsiloxane, polyphenylethoxysiloxane, polydiethylsiloxane, and the like. The siloxane polymers are generally referred to as base compounds. A rubber or gel is formed by adding a minor amount of a curing agent to the base compound. Specific examples of such curing agents are dibutyl tin dilaurate and stannous tin octoate. The resulting mixture of the base compound and the curing agent desirably is subjected to deaeration to remove any entrapped air, and is then cured at room temperature. Curing can be accelerated by applying heat if necessary. An especially preferred silicone gel is prepared by mixing about 0.8 part by weight of a curing agent available commercially under the designation RTV 619 B (General Electric) with about 10 parts by weight of a base compound available commercially under the designation RTV 619 A (General Electric). To enhance the adhesion of the resulting gel to the walls of the container or receptacle 36, a primer desirably is first applied. Suitable primers are sold under the designations SS 4004, SS 4120, SS 4044 and SS 4155 (General Electric).

In order to reduce or eliminate any reflection of light rays from the walls of the receptacle 36 through the material 38, the surfaces of the bore 36b advantageously are coated with a dark pigmented paint, or are treated with a dilute solution of an acid such as hydrochloric acid to oxidize the surfaces thereof. The silicone gel primer may then be applied to the coated or oxidized surfaces of the bore 36b.

As best shown in FIGS. 1 and 6, the receptacle 36 is provided with a cover 42 which is threadably engaged on the outer portion of the externally threaded shank 36a of the receptacle. The outer surface of the cover 42 desirably is knurled to facilitate removal from and replacement of the cover on the receptacle 36. The cover 42 serves both to prevent air-borne contaminants from settling on the contact lens-engaging dome-shaped surface 38a of the material 38, and to provide a support for a sighting card 44. To this end, the cover 42 is provided with an annular recess 42a (FIG. 2), and the card 44 has a centrally located opening 44a therethrough for positioning the card 44 in the recess 42a of the cover 42. The card 44, as shown is rectangular in shape and has a width such that the side of the card 44, when positioned on the cover 42 abuts, or nearly so, the inner end wall of the main body portion 30a of the base member 30. Vertical sighting lines 44b and 44c are provided on the face of the card 44. One of the lines 44b is shown as solid while the other line 44c is shown as dotted. The card 44 provides a convenient means for enabling an operator 50, as shown in FIG. 1, to make the necessary preliminary adjustments of the keratometer 14, for example, to establish the center of the vertical axis of a contact lens before the lens is adhered to the material 38 for examination. Thus, after the device 10 has been properly positioned on the occluder 12 of the keratometer 14, the operator 50 can focus the lens system of the instrument on the card 42. If the operator 50 observes the solid line 44b through the lens system, albeit the image of line 44b will be reversed as viewed through the eyepiece 22, he will know that he must lower the optical head of the lens system until he can observe the center of the cover 42 facing him. To aid in making this adjustment and determination, the cover 42 is provided with a small, centrally located circular dot or recess 42b which desirably is colored red, or other easily seen color. If the operator 50 initially sees the dotted line 44c on the card 44, he will know that the optical head of the lens system of the keratometer must be raised. As before, he will then locate and focus in on the center dot or recess 42b on the cover 42. When the lens system of the keratometer is focused on the recess 42b, the cover 42, and the card 44, are removed and a contact lens to be analyzed is positioned on the dome-shaped surface 38a of the material 38.

In FIGS. 12-21 of the drawing a modification of the device is illustrated. As shown, the device, designated generally by reference numeral 60, comprises, as in the case of the device 10, a base member 62 having a main body portion 62a and a lens supporting extension 62b. The main body portion 62a, like the portion 30a of the base member 30, carries a clip 64 for securing the device on an optical instrument and has a level 66 attached to the front wall thereof. A longitudinal bore 62c is provided in the main body portion 62a for rotatably receiving the elongated shaft of a marking element or stylus 68. The stylus 68 has lens marking means at one end thereof which desirably comprises a pair of aligned, wedge-shaped felt pads 70 and 72 advantageously separated by a septum or wall 74 formed of a non-absorbent plastic, metal, or the like, material. It should be understood, of course, that marking means such as crayon or paint sticks may be substituted for the pads 70 and 72. The pads each carry a marking fluid such as ink, or a water-soluble dye, which is different in color from that carried by the other, and serve to provide two easily distinguishable markings along the edge of a contact lens by rotation of the shaft of the stylus 68.

A rotatable container or receptacle 76 is carried in an externally threaded bushing 78 engaged in an internally threaded bore 62d formed in the extension 62b of the base member 62. The inner portion 76a of the receptacle 76 forms a bearing surface which is received in the bushing 78, and a shoulder 76b, which defines the outer extent of the bearing surface of the portion 76a, rides on the outer edge of the bushing 78. The receptacle 76, like the receptacle 36 of the device 10, is formed with a bore at the outer end thereof for receiving a contact lens-engaging material 80. The material 80 is the same as the material 38 previously described, and provides a dome-shaped lens supporting surface 80a extending outwardly from the exposed end of the receptacle 76. A disc 82, having graduated degree markings 84 on the outer face thereof, is concentrically secured to the receptacle 76 between the shoulder 76b and the outer end thereof. The degree markings 84 are graduated from 0° to 180°, thereby dividing the face of the disc into dual, protractor-like, semicircles, and the markings on one of the semicircles advantageously are different in color from the markings on the other semicircle to correspond to the colors of the pads 70 and 72 of the stylus 68.

It should be pointed out here that the stylus 68, the bushing 78, and the receptacle 76, together with its associated disc 82, can be used in conjunction with the base member 30 of the device 10. All that is required is the provision of a longitudinal bore 30d, corresponding to the bore 62c, in the main body portion 30a for receiving the shaft of the stylus 68. The bushing 78 can be machined to enable it to be received in the internally threaded bore 30c of the extension 30b of the base member 30.

The device 60 is especially useful for analyzing the axes of toric surfaces of toric contact lenses, and, like the device 10, is attached to the occluder, for example, of a keratometer for making the necessary determinations. As shown in FIGS. 19–21, a contact lens 90 is adhered to the material 80 with the concave side of the lens facing outwardly. Assuming for purposes of illustration that the axis of the lens to be analyzed is reported to be 15°, the operator 50 of the keratometer will set the instrument dial at 15° and, then, by focusing and locating the axis through the lens system of the instrument until a mire image is obtained wherein the horizontal and vertical meridians, as shown in the upper image 92 and the lower image 94 of FIG. 22, coincide, as illustrated in the center image 96 of FIG. 22, the operator will make a marking 90a on the edge of the lens 90 with one of the colored pads, for example, pad 70, by means of the stylus 68 (see FIG. 23). The operator then reverses the lens 90 by adhering it to the material 80 with the convex side of the lens 90 facing outwardly and with the marking on the lens aligned with the same degree marking on the disc 82 as when the edge of the lens 90 was marked with the pad 70 on the stylus 68. The stylus 68 is then rotated until the pad 72 instead of pad 70 will be in a position to mark the edge of the lens 90. The disc 80, together with the receptacle 76 and the inverted lens 90 mounted thereon, is then rotated until the operator again observes a mire image corresponding to the image 96 of FIG. 22, and marks the edge of the lens 90 with the pad 72 on the stylus 68. If the mark 90b made by the pad 72 overlies the mark 90a made by the pad 70 on the edge of the lens 90, this is an indication to the operator that the reported 15° axis of the lens is correct. If, however, the markings 90a and 90b made by the pads 72 and 72 do not coincide (overlie one another) as shown in FIG. 24, the difference represents an error in the reported axis of the lens and the variance can be read directly off the graduations on the face of the disc 80, or from the dial on the keratometer. Thus, the device 60 serves as a valuable aid to an analyst for quickly, and accurately, checking the axes of the surfaces of toric lenses. In those instances where the device is used in conjunction with a radiuscope, which is a less sophisticated instrument than the keratometer, all of the angle readings can be obtained from the graduations 84 on the disc 82. Indexing means, not shown, may be provided for the stylus 68 to assure that the pads 70 and 72 are at a right angle with respect to the horizontal axis of the lens during marking. Also, to aid an operator in properly aligning a degree marking on the disc 82 with relation to the lens system of an optical measuring instrument, a line 98 (see FIG. 2) advantageously is scribed on the wall of the main body portion of the base member 60 at a right angle to the longitudinal axis of the stylus 68.

While the invention has been illustrated and described with relation to preferred embodiments thereof, it should be understood that variations and modifications may be made in the embodiments of the device as shown and described without departing from the teachings of the invention as defined in the following claims.

What is claimed is:

1. A device for supporting a contact lens to enable the parameters of the lens, including the curvature of the surface of the lens, to be measured with an optical instrument comprising: a body member; and a lens-engaging, solid, resilient material supported by the body member, said lens-engaging material being resiliently deformable by the surface of a contact lens in engagement therewith and capable of adhering by slight pressure to said surface of the lens whereby the lens can be oriented in any desired plane with respect to an optical measuring instrument without movement in relation to or dislodgment from the lens-engaging material, said lens-engaging material being further characterized in that it is dry, non-blocking and non-smearing with respect to said surface of the contact lens and has a refractive index such that it substantially eliminates reflection from said surface of the lens.

2. A device according to claim 1 wherein the body member is provided with a well for receiving the solid, lens-engaging material, said material forming a resilient, deformable dome-shaped lens supporting area which extends outwardly from the well.

3. A device according to claim 1 wherein the lens-engaging material comprises a silicone-based elastomer.

4. A device according to claim 1 wherein the interface between the lens surface and the lens-engaging material is of the order of about four millimeters in length.

5. A device for supporting a contact lens to enable the parameters of the lens, including the curvature of the surface of the lens, to be analyzed with an optical instrument comprising: a base member; contact lens support means positioned on the base member; lens-engaging means for said support means, said lens-engaging means including a solid, resilient material to which a surface of a contact lens is removably adherable by slight pressure whereby the lens can be oriented in any desired plane with respect to an optical instrument without movment in relation to or disengagement from the material, said material having the further properties of being substantially dry to the touch, non-blocking and non-smearing with respect to the surface of a lens in engagement therewith and having a refractive index such that it substantially eliminates reflection from said surface of a lens; and, means for supporting the base member on an optical measuring instrument to enable the parameters of a lens to be analyzed.

6. A device according to claim 5 wherein the base member comprises a main body portion having an extension on which is carried the contact lens support means.

7. A device according to claim 6 wherein the contact lens support means comprises a container secured to the extension of the main body portion of the base member, said container having a well formed therein for receiving the lens-engaging means.

8. A device according to claim 7 wherein the container is provided with a removable cover for shielding the lens-engaging means from air-borne contaminants during non-use.

9. A device according to claim 5 wherein sighting means is provided on the base member to facilitate the initial adjustment of an optical measuring instrument with relation to the vertical axis of a contact lens preparatory to placing a contact lens on the lens support means.

10. A device according to claim 5 wherein the base member is provided with lens marking means for enabling the parameters of a toric contact lens to be analyzed.

11. A device according to claim 10 wherein the lens marking means comprises a stylus mounted on the base member, the stylus being provided with means for providing different colored markings on a toric contact lens supported on the lens support means.

12. A device according to claim 10 wherein angle indicating means is positioned on the base member which, in cooperation with the lens marking means, enables the parameters of a toric contact lens to be analyzed.

13. A device according to claim 12 wherein the angle indicating means is rotatably mounted on the base member in concentric relation to the contact lens support means of the device.

14. A device according to claim 5 wherein leveling means is provided on the base member to enable a contact lens to be analyzed to be properly oriented in relation to an optical measuring instrument.

15. A device for use in analyzing the parameters of a contact lens, including the curvature of the surface of the lens comprising: a base member having a main body portion and a contact lens support portion; a container detachably positioned on the lens support portion of the base member; a solid, resilient, elastomeric material in the container for releasably supporting a contact lens to be analyzed; said elastomeric material providing a dome-shaped surface to which a surface of a contact lens is removably adherable by slight pressure whereby the lens can be oriented in a vertical or horizontal plane while being analyzed, said elastomeric material being substantially dry to the touch, non-blocking and non-smearing with respect to the surface of a lens adhered thereto and having a refractive index such that it substantially eliminates reflection from said surface of the lens, a removable cover for the container for shielding the elastomeric material from contaminants, and clip means on the main body portion of the base member to enable the device to be attached to an optical measuring instrument for analyzing the parameters of a contact lens.

16. A device according to claim 15 wherein a stylus for marking indicia on a contact lens, and a rotatable disc for angle-orientation of a contact lens, are positioned on the base member for enabling the axes of the surfaces of a toric contact lens to be analyzed.

* * * * *